United States Patent [19]

Guzik et al.

[11] Patent Number: 4,958,839
[45] Date of Patent: Sep. 25, 1990

[54] DISC CLAMP EMPLOYING RESILIENT CONE FOR SPREADING BALLS

[75] Inventors: Nahum Guzik, Mountain View; Vinod Rao, Fremont, both of Calif.

[73] Assignee: Guzik Technical Enterprises, Inc., San Jose, Calif.

[21] Appl. No.: 217,875

[22] Filed: Jul. 12, 1988

[51] Int. Cl.$^5$ .................. B23B 31/40; G11B 25/04
[52] U.S. Cl. .................. 279/2 R; 242/68.3; 279/1 Q; 369/271
[58] Field of Search .................. 279/2 R, 2 A, 1 Q; 369/270, 271; 242/68.3

[56] References Cited

U.S. PATENT DOCUMENTS

| | | | |
|---|---|---|---|
| 3,857,526 | 12/1974 | Dischert | 242/68.3 |
| 3,946,962 | 3/1976 | Deletzke, Jr. | 242/68.3 |
| 4,432,506 | 2/1984 | Bingaman | 279/2 R X |
| 4,720,114 | 1/1988 | Braitmaier et al. | 279/2 R |

FOREIGN PATENT DOCUMENTS

| | | | |
|---|---|---|---|
| 0194181 | 11/1983 | Japan | 369/270 |
| 0212958 | 9/1987 | Japan | 369/270 |
| 0039168 | 2/1988 | Japan | 369/270 |

*Primary Examiner*—Z. R. Bilinsky
*Attorney, Agent, or Firm*—David Pressman

[57] ABSTRACT

A ball-type clamping mechanism for clamping computer hard disks in a disk tester for accurate measuring of the disk's parameters comprises a cup-shaped support (10) which is installed on a rotating part of the tester and serves to support a computer hard disk (20) which rests on the upper surface of the support. The support has a cylindrical opening (12) with a diameter equal to or slightly greater than the diameter of the disk opening. Slidingly inserted into the support (10) is a cylindrical retainer (26) which carries clamping balls (28) uniformly spaced from each other in a circumferential direction and located in recesses (30) formed in the side wall of the retainer. The balls have a diameter larger than the side wall of the retainer (26). A pull rod (40) passes through the central opening in the bottom wall of the support and carries a clamping cone (42) which is made from a resilient material softer than the material of the balls (28). When the rod is pulled down, a conical surface (50) of the clamping cone (42) pushes the balls radially outwardly into contact with the inner periphery of the hard disk, so that the disk is clamped. The number of balls exceeds three, so that a uniform clamping force is provided on each of the balls. Because the cone is made from a resilient material, the balls clamp the disk with a uniform force without the necessity of manufacturing the parts with accurate tolerances.

15 Claims, 1 Drawing Sheet

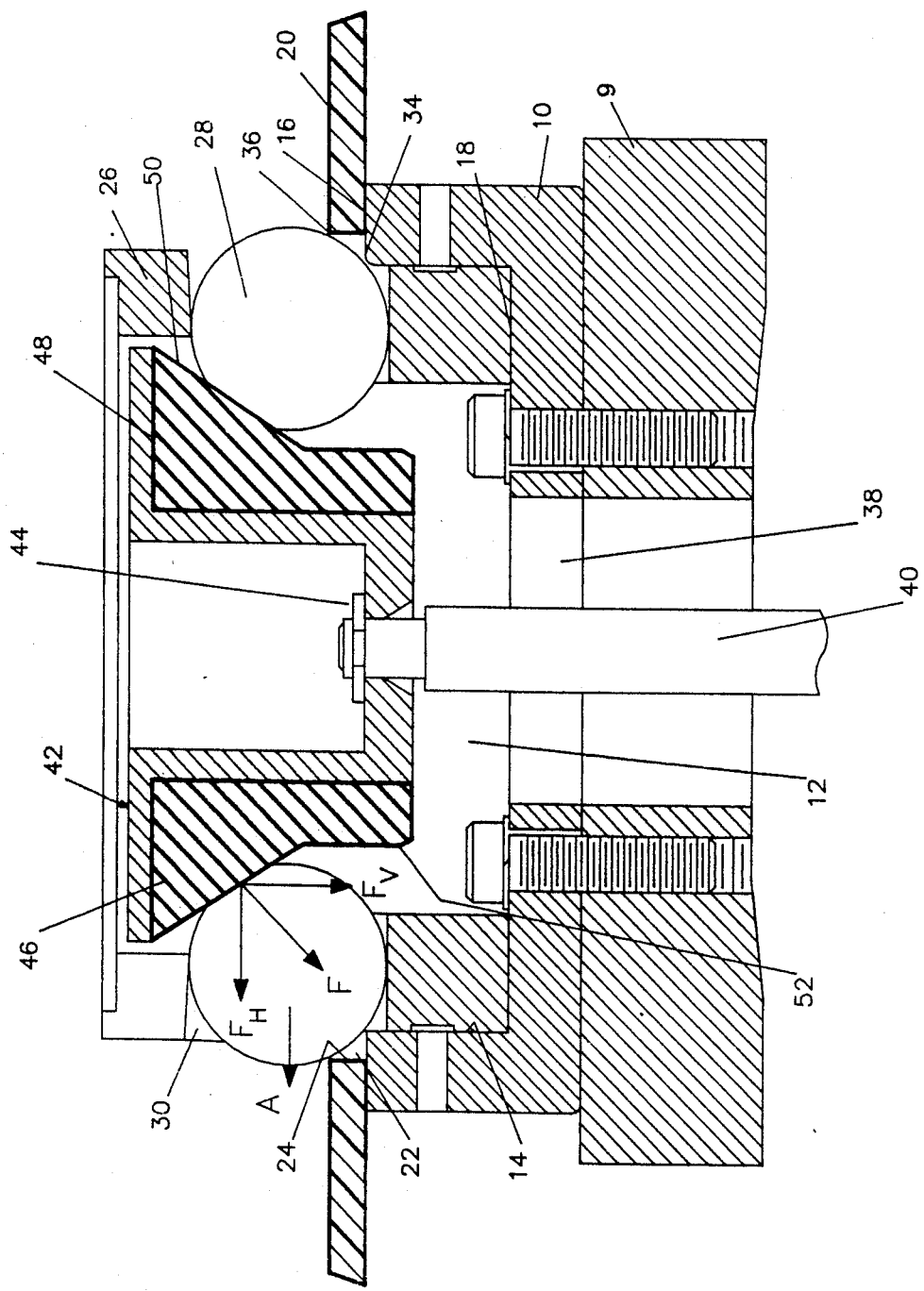

DISC CLAMP EMPLOYING RESILIENT CONE FOR SPREADING BALLS

BACKGROUND

1. Field of the Invention

The present invention relates to a mechanism for holding computer disks, particularly to mechanisms for clamping computer hard disks in disk drives, disk testers, etc.

BACKGROUND

2. Description of the Prior Art

In order accurately to measure the parameters of computer disks, it is very important that they be accurately installed and uniformly clamped on a disk tester. It is especially important for hard disks since their parameters are more critical and since they rotate at a high speed, i.e., in the range of 3600 to 10,000 r.p.m., or higher.

Ball-type clamping mechanisms for clamping hard disks are known in the art. These comprise a support for the disk, a retainer which is installed on the support within the inner periphery of a disk opening and which carries clamping balls, a pressure cone which is connected to a pull rod which urges the cone's conical surface onto the clamping balls to push them radially outwardly so as to clamp the disk by pressing against the inner periphery of its central opening. Such a clamping mechanism is used, e.g., in disk tester Model S211 produced by Guzik Technical Enterprises, Sunnyvale, Calif.

In the mechanism described above, the cone is made from metal and the three clamping balls are uniformly arranged in a circumferential direction. However the use of only three balls, which were spaced at relatively long distances from each other, caused non-uniform deflection of the inner periphery of the disk during clamping. Therefore buckling of the disk could be prevented only by using a very low clamping force, but this allowed the disk to slip. In addition, accurate measurement or checking of the clamping force was often required, so as to be sure the correct clamping force was present.

An attempt has been made to eliminate buckling of the disk by using more than three balls. Although it was easy to cause three balls to self-align with equal force on each ball, it was impossible to do this when more than three balls were used. To alleviate this problem and to provide accurate positioning of the balls and uniform clamping of the disk, it was necessary to make the cone, the balls, and the other parts with highly accurate dimensions. This increased the cost of the manufacture by lowering the yield, increasing the labor, and increasing the cost. This caused the price of the tester to be relatively high.

To obviate these disadvantages, an attempt has been made to form the balls from a soft material, such as polyurethane. The use of soft balls to some extent compensated for the lack of self-alignment, but frequent installation and removal of disks on the tester left indentations on the surfaces of the balls, so that the balls wore out and had to be replaced.

OBJECTS AND ADVANTAGES OF THE INVENTION

It is accordingly one object is to provide a ball-type disk clamping mechanism which has a uniform distribution of the clamping force without the need for accurate tolerances on the cone, balls, and other parts. Another object is to provide a ball-type disk clamping device in which the balls are not subject to wear. Still another object is to provide a disk clamping mechanism which does not require frequent checking of the clamping force. Yet another object is to provide a support mechanism for a disk or other rotatable member which is more economical, lighter in weight, more reliable, etc. Further objects and advantages will become apparent after consideration of the ensuing description and the accompanying drawing.

BRIEF DESCRIPTION OF THE DRAWING

The accompanying single figure of drawing is a side sectional view of a disk clamping mechanism according to the invention.

REFERENCE NUMERALS USED IN THE DESCRIPTION AND DRAWINGS

10—support
12—cavity of support
14—inner wall of support opening
16—upper surface of the support
18—bottom wall
20—computer hard disk
22—disk opening
24—inner edge of disk opening
26—retainer
28—clamping balls
30—openings
34—upper inner edge of the support opening
36—upper inner edge of the disk opening
38—central through opening of the support
40—pull rod
42—clamping cone
44—lock washer
46—conical body
48—metal insert
49—flange part of insert
50—conical surface
52—cylindrical surface

DETAILED DESCRIPTION OF THE INVENTION

A disk clamping mechanism of the invention is shown in the drawing and comprises a cup-shaped disk support 10 which is bolted to a base 9 and has an opening or cavity 12. Cavity 12 has inner wall 14, an upper surface 16, and a bottom wall 18. A computer hard disk 20, which is to be clamped for testing during rotation, rests on upper surface 16 of support 10, and has an opening 22 with an inner edge 24. Opening 22 has a diameter which is equal to or slightly greater than that of cavity 12.

A cylindrical retainer 26 is inserted with a sliding fit into cavity 12. Retainer 26 rests on bottom wall 18 and carries clamping balls 28 which are located in through openings 30 formed in retainer 26. Balls 28 are uniformly spaced from each other in a circumferential direction. The diameter of each opening 30 is equal to or slightly exceeds the diameter of each ball 28; thus the balls can protrude slightly outward from the retainer. The outer diameter of the retainer itself is slightly smaller than the diameter of opening 22 of disk 20.

When no hard disk is positioned on the support, balls 28 are restrained from falling out from retainer 26 by an upper inner edge 34 of support cavity 12. When hard disk 20 is so positioned, upper inner edge 36 restrains the balls. For this purpose, when the retainer rests on bottom wall 18 of support 10, the longitudinal axis A of each opening 30 is slightly higher than the upper surface of hard disk 20 when the disk rests on the support.

Retainer 26 has a wall thickness smaller than the diameter of the balls. For uniform clamping of disk 20, preferably more than three clamping balls 28 are provided in corresponding openings 30. In the illustrated example, retainer 26 supports six clamping balls within six openings 30.

Bottom wall 18 of support 10 has a through central opening 38. A pull rod 40 passes through opening 38 and supports on its upper end a clamping cone 42 which is rigidly fixed to the pull rod by a lock washer 44. Cone 42 is arranged so that its large diameter end is above balls 28 and its small diameter end faces the bottom wall of support 10. Thus the conical surface of the cone normally rests on balls 28. Pull rod 40 is driven from a drive device (not shown) which causes the rod to move up and down, i.e., in the vertical or axial direction. Support 10 rotates together with parts installed on it with an accurate speed of between 3000 and 10,000 r.p.m. or more about an axis which coincides with the longitudinal axis of rod 40, i.e., the support rotates around an axis which passes through the center of central opening 38.

An essential feature of the invention is that the outer surface of cone 42 is made from a soft and resilient material, such as rubber or plastic In the illustrated case, cone 42 consists of a resilient conical body 46 and a metal insert 48. Conical body 46 can be molded from polyurethane, and metal insert 48 from steel. Cone 42 has an outer surface which consists of an upper conical portion 50 having a conventional continuous surface and a lower cylindrical portion 52.

Metal insert 48 can be pressed into conical body 46 by a press fit, or the insert can be embedded in the material of the resilient conical body. Insert 48 is cylindrical with a bottom end which is closed except for a central through hole for pull rod 40; its upper end has a flange part 49 which extends radially outward.

Cone 42 has a diameter such that when rod 40 is not pulled down, conical portion 50 rests on balls 28 and when pull rod 40 is pulled down, the conical surface of resilient conical body 46 pushes balls outwardly and radially against disk 20.

Balls 28 can be made from a material harder than the cone, e.g., from hard plastic, having hardness exceeding 100 durometer, while the cone should have hardness of about 85 durometer or less.

OPERATION

For testing hard disk 20, the disk is placed onto upper surface 16 of support 10. The disk is then clamped for testing by actuating pull rod 40 from a mechanism below (not shown). When rod 40 moves down, it also pulls down cone 42, so that resilient conical portion 50 of the cone presses against balls 28 with forces F which are perpendicular to conical surface 50 at the points of contact between this surface and the balls. Force F on each ball has a horizontal component $F_H$ and a vertical component $F_V$. Component $F_H$ pushes each ball into contact with upper inner edge 36 of hard disk 20. Because the number of balls exceeds three, the disk is clamped with a uniform force and is protected from buckling. Since conical body 46 is made from a resilient and soft material, it will compensate the tolerances and provide uniform distribution of the clamping force on all balls, even when their number is higher than three.

SUMMARY, RAMIFICATION, SCOPE

Thus it has been shown that the ball-type disk clamping mechanism of the invention provides a uniform clamping force, and enables the balls and retainer to be manufactured without accurate dimensional and positioning tolerances. Because the disk is always clamped with an accurate force, the force measurement operation becomes unnecessary. As the balls are made from the material harder than the material of the cone, they are not subject to wear.

Although the invention has been shown and described in the form of the specific embodiment, it is understood that its parts, material and configurations were given only as examples, and that many other modifications of the disk clamping mechanism are possible. For example, the clamping cone can be used without the metal insert and can be molded entirely from plastic or rubber, or the insert can be made from a rigid plastic which is harder than the material of the resilient conical body. There can be fewer or more than six balls in the retainer. The cone can be attached to the pull rod by means of a threaded connection, or by any other suitable method. The mechanism of the invention can be used for clamping parts other than computer disks on devices other than disk drives, or disk testers. For example, it can be used as a chuck for holding workpieces which require accurate clamping and positioning. Therefore the scope of the invention should be determined, not by the example given, but by the appended claims and their legal equivalents.

What we claim is:

1. A clamping mechanism for a computer hard disc having a predetermined thickness and a central opening, comprising:
    a disc support having a cylindrical opening, side walls, a bottom wall, an upper surface for supporting a hard disc to be clamped, and a central opening in said bottom wall,
    said cylindrical opening of said disc support having a diameter substantially equal to said central opening of said hard disc;
    a cylindrical retainer slidingly inserted into said cylindrical opening of said support and resting upon said bottom wall of said disc support,
    said retainer having more than three through openings in a side wall thereof, said openings being uniformly spaced in a circumferential direction, said openings having axes located higher than the upper surface of said hard disc when said disc rests on said upper surface of said support;
    a plurality of rigid balls slidingly located in said respective through openings of said retainer, said balls having diameters exceeding the thickness of said side wall of said retainer;
    a pull rod capable of moving in the longitudinal direction, said pull rod having an upper end which passes through said central opening of said bottom wall into said cylindrical retainer;
    a conical element rigidly attached to said upper end of said pull rod, said conical element having a continuous outer conical surface which is resilient and softer than said balls,
    said conical element having a larger diameter end and a smaller diameter end, said larger diameter end located above said balls and said smaller diameter end facing said bottom wall of said support, said conical element and said pull rod being moveable between upper and lower positions and being shaped such that when said pull rod and said conical element are in their upper position, the conical surface of said conical element rests upon said balls, and such that when said pull rod and said conical element are pulled down to their lower position, said conical surface will wedge and hold said balls outwardly to positions where they lock said hard disc onto said support.

2. The clamping mechanism of claim 1 wherein said balls are made from nylon, and said resilient conical element is made from polyurethane.

3. The clamping mechanism of claim 1 wherein said conical element consists of a hollow conical body made from a resilient material and an insert which is made from a material harder than said resilient body and is inserted into said hollow portion of said conical body.

4. The clamping mechanism of claim 3 wherein said insert is made from metal and said resilient body is made from plastic.

5. The clamping mechanism of claim 1 wherein the number of said balls is six.

6. The clamping mechanism of claim 1 wherein said conical element has an outer surface which consists of a conical portion located in the area of contact with said balls and a cylindrical portion located below said conical portion.

7. The clamping mechanism of claim 1 wherein said resilient conical element has a hardness below 85 durometer, and said balls have hardnesses above 100 durometer.

8. A clamping mechanism for clamping, on a disc tester, computer hard discs having central openings, said discs each having a predetermined thickness, comprising:

a cylindrical disc support having a cylindrical opening, side walls, a bottom wall, an upper surface for supporting a hard disc to be clamped, and a central opening in said bottom wall, said cylindrical opening of said disc support having a diameter substantially equal to said central opening of said hard disc;

said disc support being attached to a base of said tester which rotates about an axis, said axis passing through the center of said central opening;

a cylindrical retainer slidingly inserted into said cylindrical opening of said support and resting upon said bottom wall of said disc support, said retainer having more than three through openings in a side wall thereof, said openings being uniformly spaced in a circumferential direction, said openings having axes located higher than the upper surface of one of said hard discs when said disc rests on said upper surface of said support;

a plurality of rigid balls slidingly located in said respective through openings of said retainer, said balls having diameters exceeding the thickness of said side wall of said retainer so that the edges of said balls can protrude beyond the outer periphery of said retainer and come into contact with said opening of said hard disc, when said hard disc is positioned on said support;

a pull rod capable of moving in the longitudinal direction, said pull rod having an upper end which passes through said central opening of said bottom wall into said cylindrical retainer;

a conical element rigidly attached to said upper end of said pull rod, said conical element having a continuous outer conical surface which is resilient and softer than said balls, said conical element having a larger diameter end and a smaller diameter end, said larger diameter end located above said balls and said smaller diameter end facing said bottom wall of said support, said conical element and said pull rod being moveable between upper and lower positions and being shaped such that when said pull rod and said conical element are in their upper position, the conical surface of said conical element rests upon said balls, and such that when said pull rod and said conical element are pulled down to their lower position, said conical surface will wedge and hold said balls outwardly to positions where they lock said hard disc onto said support.

9. The clamping mechanism of claim 8 wherein said balls are made from nylon, and said resilient conical element is made from polyurethane.

10. The clamping mechanism of claim 8 wherein said conical element consists of a hollow conical body made from a resilient material and an insert which is made from a material harder than said resilient body and is inserted into said hollow portion of said conical body.

11. The clamping mechanism of claim 10 wherein said insert is made from metal and said resilient body is made from plastic.

12. The clamping mechanism of claim 11 wherein said plastic is polyurethane.

13. The clamping mechanism of claim 12 wherein the number of said balls is six.

14. The clamping mechanism of claim 8 wherein said conical element has an outer surface which consists of a conical portion located in the area of contact with said balls and a cylindrical portion located below said conical portion.

15. The clamping mechanism of claim 8 wherein said resilient conical element has a hardness below 85 durometer, and said balls have hardnesses above 100 durometer.

* * * * *